United States Patent
Karhade et al.

(10) Patent No.: US 12,366,713 B2
(45) Date of Patent: Jul. 22, 2025

(54) HEAT DISSIPATION STRUCTURES FOR OPTICAL COMMUNICATION DEVICES

(71) Applicant: Intel Corporation, Santa Clara, CA (US)

(72) Inventors: Omkar Karhade, Chandler, AZ (US); Tolga Acikalin, San Jose, CA (US); Sushrutha Gujjula, Chandler, AZ (US); Kelly Lofgreen, Phoenix, AZ (US); Ravindranath Mahajan, Chandler, AZ (US); Chia-pin Chiu, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 17/344,213

(22) Filed: Jun. 10, 2021

(65) Prior Publication Data
US 2022/0397726 A1   Dec. 15, 2022

(51) Int. Cl.
G02B 6/42       (2006.01)
F21V 8/00       (2006.01)
G02B 6/12       (2006.01)

(52) U.S. Cl.
CPC ......... *G02B 6/4202* (2013.01); *G02B 6/0083* (2013.01); *G02B 6/4269* (2013.01); *G02B 6/4271* (2013.01); *G02B 2006/1213* (2013.01)

(58) Field of Classification Search
CPC .. G02B 6/4202; G02B 6/0083; G02B 6/4269; G02B 6/4271; G02B 2006/1213; G02B 6/4274
See application file for complete search history.

(56) References Cited

U.S. PATENT DOCUMENTS

| 9,360,620 | B2 * | 6/2016 | Ramaswamy | G02B 6/4269 |
| 11,564,312 | B2 * | 1/2023 | Verslegers | H05K 1/0274 |
| 11,852,877 | B2 * | 12/2023 | Choi | G02B 6/4228 |

* cited by examiner

*Primary Examiner* — John Bedtelyon
(74) *Attorney, Agent, or Firm* — Essential Patents Group, LLP (57) ABSTRACT

An electronic assembly, such as an integrated circuit package, may be formed comprising a package substrate and a photonic integrated circuit device attached thereto, wherein the package substrate includes a heat dissipation structure disposed therein. A back surface of the photonic integrated circuit device may thermally coupled to the heat dissipation structure within the package substrate for the removal of heat from the photonic integrated circuit device, which allows for access to an active surface of the photonic integrated circuit device for the attachment of fiber optic cables and eliminates the need for a heat dissipation device to be thermally attached to the active surface of the photonic integrated circuit device.

25 Claims, 7 Drawing Sheets

HEAT DISSIPATION STRUCTURES FOR OPTICAL COMMUNICATION DEVICES

TECHNICAL FIELD

Embodiments of the present description generally relate to the field of integrated circuit assemblies and, more particularly, to the integration of heat dissipation structures for optical communication devices in integrated circuit assemblies.

BACKGROUND

The integrated circuit industry is continually striving to produce ever faster and smaller integrated circuit devices for use in various server and mobile electronic products, including but not limited to, computer server products and portable products, such as wearable integrated circuit systems, portable computers, electronic tablets, cellular phones, digital cameras, and the like.

As these goals are achieved, the integrated circuit devices become smaller. However, communication demands have been increasing considerably faster than scaling (e.g., Moore's law) can achieve. For example, machine intelligence systems are requiring core counts in the thousands, "near compute" memory of greater than 10 gigabytes, connectivity bandwidth of greater than one terabyte per second between multiple nodes, low latency, thermal control, and good manufacturability, as will be understood to those skilled in the art. Of course, signal loss significantly increases with metal conductive routes (used for electrical interconnects) as signaling frequency increases and distance between the integrated circuit devices increases. Furthermore, the routing of the conductive routes becomes increasingly complex as more integrated circuit devices are added to an integrated circuit package. Thus, optical interconnects are being used to replace electrical interconnects, as optical interconnects offer very high bandwidths compared to electrical interconnects. As will be understood to those skilled in the art, photonic integrated circuit devices are used to convert electrical signals to optical signals. These photonic integrated circuit devices may be integrated in an "Open Cavity" configuration, wherein the photonic integrated circuit devices are at least partially embedded in a package substrate that allows for direct photonic integrated circuit device to electronic integrated chip (a controller for the photonic integrated circuit device) connection for better power efficiency, allows for less obstructed access to the photonic integrated circuit device for the attachment of optical communication cables, and allows for access to hotspots on photonic integrated circuit device for targeted cooling. As will be further understood, photonic integrated circuit devices may have lasing components, amplifiers, and/or other electrical circuits which generate significant power densities (e.g., about 50 to 150 watts per square millimeter compared to a processing or computing device which may have power densities of about 5 to 50 watts per square millimeter, depending on use condition). Furthermore, optical components, such as lasers, can typically only tolerate a maximum temperature of between about 70 and 90 degrees Celsius compared to the maximum junction temperatures on processing or computing devices of between about 100 to 110 degrees Celsius. Thus, the cooling the photonic integrated circuit devices is a significant challenge.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. It is understood that the accompanying drawings depict only several embodiments in accordance with the present disclosure and are, therefore, not to be considered limiting of its scope. The disclosure will be described with additional specificity and detail through use of the accompanying drawings, such that the advantages of the present disclosure can be more readily ascertained, in which:

DETAILED DESCRIPTION

In the following detailed description, reference is made to the accompanying drawings that show, by way of illustration, specific embodiments in which the claimed subject matter may be practiced. These embodiments are described in sufficient detail to enable those skilled in the art to practice the subject matter. It is to be understood that the various embodiments, although different, are not necessarily mutually exclusive. For example, a particular feature, structure, or characteristic described herein, in connection with one embodiment, may be implemented within other embodiments without departing from the spirit and scope of the claimed subject matter. References within this specification to "one embodiment" or "an embodiment" mean that a particular feature, structure, or characteristic described in connection with the embodiment is included in at least one implementation encompassed within the present description. Therefore, the use of the phrase "one embodiment" or "in an embodiment" does not necessarily refer to the same embodiment. In addition, it is to be understood that the location or arrangement of individual elements within each disclosed embodiment may be modified without departing from the spirit and scope of the claimed subject matter. The following detailed description is, therefore, not to be taken in a limiting sense, and the scope of the subject matter is defined only by the appended claims, appropriately interpreted, along with the full range of equivalents to which the appended claims are entitled. In the drawings, like numerals refer to the same or similar elements or functionality throughout the several views, and that elements depicted therein are not necessarily to scale with one another, rather individual elements may be enlarged or reduced in order to more easily comprehend the elements in the context of the present description.

The terms "over", "to", "between" and "on" as used herein may refer to a relative position of one layer with respect to other layers. One layer "over" or "on" another layer or bonded "to" another layer may be directly in contact with the other layer or may have one or more intervening layers. One layer "between" layers may be directly in contact with the layers or may have one or more intervening layers.

The term "package" generally refers to a self-contained carrier of one or more dice, where the dice are attached to the package substrate, and may be encapsulated for protection, with integrated or wire-bonded interconnects between the dice and leads, pins or bumps located on the external portions of the package substrate. The package may contain a single die, or multiple dice, providing a specific function. The package is usually mounted on a printed circuit board for interconnection with other packaged integrated circuits and discrete components, forming a larger circuit.

Here, the term "cored" generally refers to a substrate of an integrated circuit package built upon a board, card or wafer comprising a non-flexible stiff material. Typically, a small printed circuit board is used as a core, upon which integrated circuit device and discrete passive components may be soldered. Typically, the core has vias extending from one side to the other, allowing circuitry on one side of the core to be coupled directly to circuitry on the opposite side of the core. The core may also serve as a platform for building up layers of conductors and dielectric materials.

Here, the term "coreless" generally refers to a substrate of an integrated circuit package having no core. The lack of a core allows for higher-density package architectures, as the through-vias have relatively large dimensions and pitch compared to high-density interconnects.

Here, the term "land side", if used herein, generally refers to the side of the substrate of the integrated circuit package closest to the plane of attachment to a printed circuit board, motherboard, or other package. This is in contrast to the term "die side", which is the side of the substrate of the integrated circuit package to which the die or dice are attached.

Here, the term "dielectric" generally refers to any number of non-electrically conductive materials that make up the structure of a package substrate. For purposes of this disclosure, dielectric material may be incorporated into an integrated circuit package as layers of laminate film or as a resin molded over integrated circuit dice mounted on the substrate.

Here, the term "metallization" generally refers to metal layers formed over and through the dielectric material of the package substrate. The metal layers are generally patterned to form metal structures such as traces and bond pads. The metallization of a package substrate may be confined to a single layer or in multiple layers separated by layers of dielectric.

Here, the term "bond pad" generally refers to metallization structures that terminate integrated traces and vias in integrated circuit packages and dies. The term "solder pad" may be occasionally substituted for "bond pad" and carries the same meaning.

Here, the term "solder bump" generally refers to a solder layer formed on a bond pad. The solder layer typically has a round shape, hence the term "solder bump".

Here, the term "substrate" generally refers to a planar platform comprising dielectric and metallization structures. The substrate mechanically supports and electrically couples one or more IC dies on a single platform, with encapsulation of the one or more IC dies by a moldable dielectric material. The substrate generally comprises solder bumps as bonding interconnects on both sides. One side of the substrate, generally referred to as the "die side", comprises solder bumps for chip or die bonding. The opposite side of the substrate, generally referred to as the "land side", comprises solder bumps for bonding the package to a printed circuit board.

Here, the term "assembly" generally refers to a grouping of parts into a single functional unit. The parts may be separate and are mechanically assembled into a functional unit, where the parts may be removable. In another instance, the parts may be permanently bonded together. In some instances, the parts are integrated together.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, magnetic or fluidic connection between the things that are connected or an indirect connection, through one or more passive or active intermediary devices.

The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The vertical orientation is in the z-direction and it is understood that recitations of "top", "bottom", "above" and "below" refer to relative positions in the z-dimension with the usual meaning. However, it is understood that embodiments are not necessarily limited to the orientations or configurations illustrated in the figure.

The terms "substantially," "close," "approximately," "near," and "about," generally refer to being within +/−10% of a target value (unless specifically specified). Unless otherwise specified the use of the ordinal adjectives "first," "second," and "third," etc., to describe a common object, merely indicate that different instances of like objects to which are being referred and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Views labeled "cross-sectional", "profile" and "plan" correspond to orthogonal planes within a cartesian coordinate system. Thus, cross-sectional and profile views are taken in the x-z plane, and plan views are taken in the x-y plane. Typically, profile views in the x-z plane are cross-sectional views. Where appropriate, drawings are labeled with axes to indicate the orientation of the figure.

Embodiments of the present description relate to the removal of heat from a photonic integrated circuit device within an electronic assembly, such as an integrated circuit package, wherein the removal of heat is facilitated with a heat dissipation structure within a package substrate to which the photonic integrated circuit device is attached. Embodiments of the present description facilitate heat removal from a back surface of a photonic integrated circuit device rather than an active surface thereof, which may allow for unobstructed access to the active surface for the attachment of optical communication cables and may eliminate the need for a heat dissipation device being thermally attached to the active surface of the photonic integrated circuit device.

Figure 1:
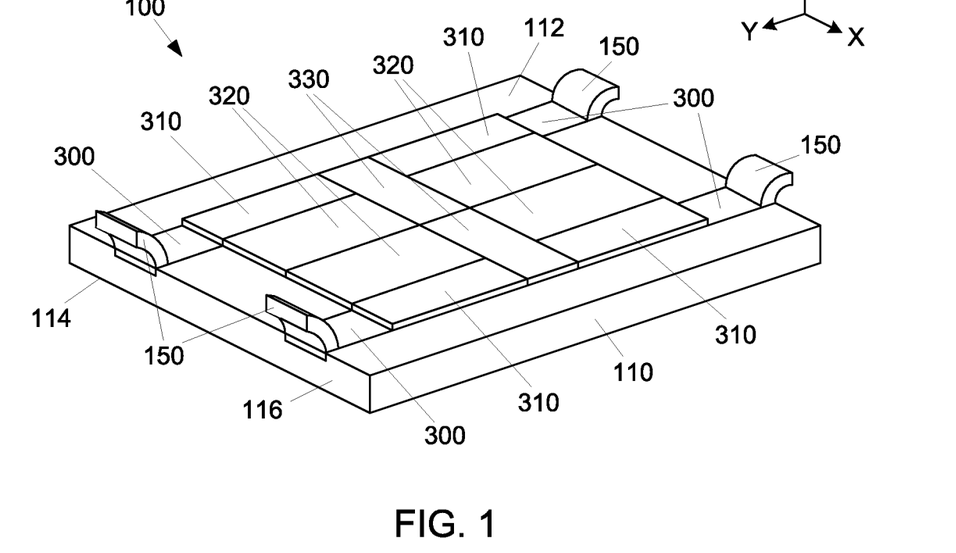
FIG. 1 is an oblique view of the integrated circuit package, according to an embodiment of the present description.

FIG. 1 illustrates an electronic assembly 100, such as an integrated circuit package. The electronic assembly 100 may include at least one photonic integrated circuit device 300 electrically attached to a package substrate 110, wherein each photonic integrated circuit device 300 may have an optical communication cable 150, such as an optic fiber cable, attached thereto. A plurality of integrated circuit devices 300, 310, 320, and 330 electrically attached to a package substrate 110. In one embodiment, at least one of the integrated circuit devices 310, 320, and 330 may be electrically attached to the package substrate 110 in a configuration generally known as a flip-chip or controlled collapse chip connection ("C4") configuration, according to an embodiment of the present description.

The package substrate 110 may be any appropriate structure, including, but not limited to, an interposer. The package substrate 110 may have a first surface 112, an opposing second surface 114, and at least one side 116 extending between the first surface 112 and the second surface 114. The package substrate 110 may comprise a plurality of dielectric material layers (not shown), which may include build-up films and/or solder resist layers, and may be composed of an appropriate dielectric material, including, but not limited to, bismaleimide triazine resin, fire retardant grade 4 material, polyimide material, silica filled epoxy material, glass reinforced epoxy material, low temperature co-fired ceramic materials, and the like, as well as low-k and ultra low-k dielectrics (dielectric constants less than about 3.6), including, but not limited to, carbon doped dielectrics, fluorine doped dielectrics, porous dielectrics, organic polymeric dielectrics, fluoropolymers, and the like.

The package substrate 110 may further include conductive routes 118 or "metallization" (not shown in FIG. 1, but shown in dashed lines in FIG. 2) extending through the package substrate 110. These conductive routes 118 may be a combination of conductive traces (not shown) formed between the dielectric material layers (not shown) and conductive vias (not shown) extending through the dielectric material layers (not shown). The structure and fabrication of conductive traces and conductive vias are well known in the art and are not shown or described for purposes of clarity and conciseness. The conductive traces and the conductive vias may be made of any appropriate electrically conductive material, including, but not limited to, metals, such as copper, silver, nickel, gold, and aluminum, alloys thereof, and the like. As will be understood to those skilled in the art, the package substrate 110 may be a cored substrate or a coreless substrate.

Each of the integrated circuit devices 310, 320, and 330 may be any appropriate device, including, but not limited to, a microprocessor, a chipset, a graphics device, a wireless device, a memory device, an application specific integrated circuit, a transceiver device, an input/output device, combinations thereof, stacks thereof, or the like. In a specific embodiment, integrated circuit devices 310 may be input/output control hubs, integrated circuit devices 320 may be processing units, and integrated circuit devices 330 may be cache memory devices.

Figure 2:
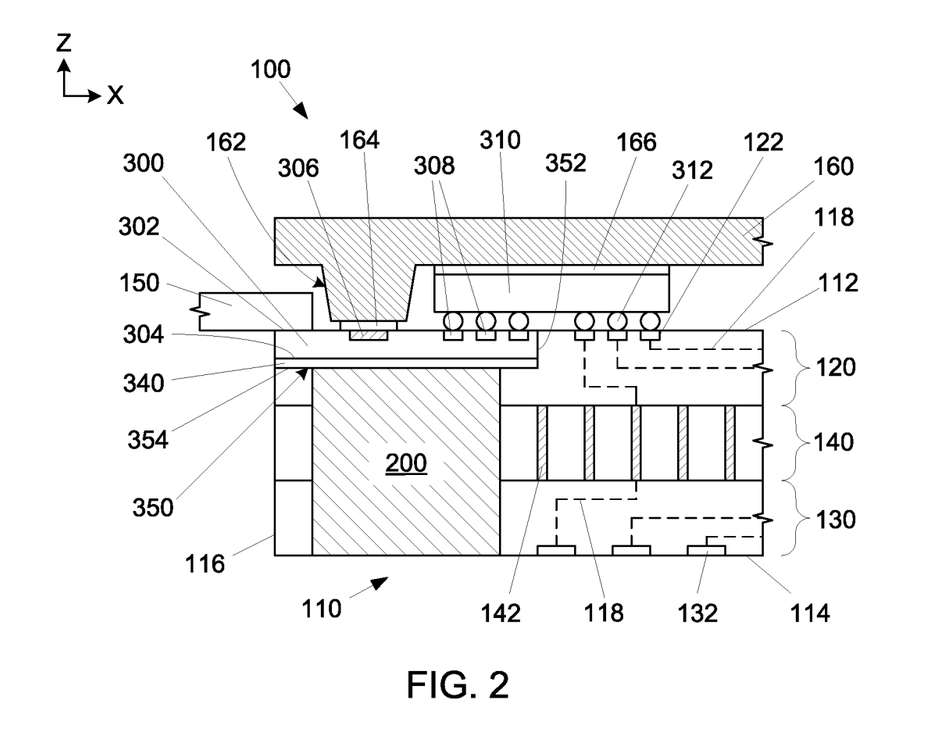
FIGS. 2 and 3 are side cross-sectional views of electronic assemblies including package substrates that include single component heat dissipation structures therein that are thermally coupled to photonic integrated circuit devices, according to embodiments of the present description.

As shown in FIG. 2, the package substrate 110 may include a heat dissipation structure 200 disposed therein. The heat dissipation structure 200 may comprise any appropriate thermally conductive material, including, but not limited to, metals, such as copper, silver, nickel, gold, and aluminum, alloys thereof, and the like. As further shown in FIG. 2, the photonic integrated circuit device 300 may have an active surface 302 and an opposing back surface 304. As will be understood to those skilled in the art, the active surface 302 is the surface in which active circuitry, active structures, and interconnection structures are formed, such as lasing components 306, bond pads 308, and structures (not shown—e.g., sockets, clips, plugs and the like) for connection of the optical communication cable 150. As illustrated the back surface 304 of the photonic integrated circuit device 300 may be attached to the package substrate 110 with a thermally conductive adhesive layer 340, such that the photonic integrated circuit device 300 is thermally coupled with the heat dissipation structure 200. In one embodiment of the present description, the first surface 112 of the package substrate 110 may include a recess or cavity 350 comprising a sidewall 352 and a bottom surface 354. The photonic integrated circuit device 300 may be disposed within the cavity 350 in a configuration known as "open cavity". As shown, the photonic integrated circuit device 300 may be electrically connected to an electronic integrated chip (EIC) 310 through a plurality of interconnects 312 extending from the bond pads 308 on or in the active surface 302 of the photonic integrated circuit device 300 to the electronic integrated chip 310. As will be understood to those skilled in the art, each photonic integrated circuit device 300 must be controlled by a corresponding electronic integrated chip 310, which has a similar integration scale as the photonic integrated circuit device 300 and which including both digital control circuits and analog control and monitoring circuits (e.g., low noise amplifiers and drivers). The electronic integrated chip 310 may also be electrically coupled to at least one conductive route 118 of the package substrate 110 through the interconnects 312 extending from bond pads 122 on or in the first surface 112 of the package substrate 110 to the electronic integrated chip 310.

In the embodiment illustrated in FIG. 2, the package substrate 110 may be a cored substrate, having a first electrical routing layer 120 proximate the first surface 112 thereof, a second electrical routing layer 130 proximate the second surface 114 thereof, and a core 140 between the first electrical routing layer 120 and the second electrical routing layer 130. The core 140 may include a plurality of electrically conductive vias 142, such as plated through-hole vias. The electrically conductive vias 142 may be a portion of the conductive routes 118 connecting a portion of the conductive routes 118 within the first electrical routing layer 120 and a portion of the conductive routes 118 within the second electrical routing layer 130. The conductive routes 118 may be connected to external bond pads 132, which may be utilized to connect the electronic assembly 100 to external components, as will be discussed.

The electronic assembly 100 may further include a heat dissipation device 160. The heat dissipation device 160 may be thermally coupled to the electronic integrated chip 310 with a thermal interface material 166 (as well as other integrated circuit devices, such as integrated circuit devices 320 and 330 shown in FIG. 1). The heat dissipation device 160 may include a footing 162 extending toward the photonic integrated circuit device 300. The footing 162 may be thermally coupled to the active surface 302 of the photonic integrated circuit device 300 with a thermal interface material layer 164 in order to remove heat from high heat generating components, such as the lasing component 306.

In one embodiment of the present description, the heat dissipation structure 200 may comprise a single, thermally conductive structure or passive heat sink formed from any thermally conductive material, including, but not limited to, metals, such copper, aluminum, alloys thereof, and the like. In an embodiment of the present description, the heat dissipation structure may be formed as a part of the formation of the substrate itself, as will be understood to those skilled in the art. In a further embodiment of the present description, the heat dissipation structure 200 may be a thermoelectric cooler. The thermoelectric cooler may comprise any device that uses the Peltier effect to create a heat flux at a junction of two different types of materials. When the heat dissipation structure 200 is a thermoelectric cooler, it may be powered with electric connections (not shown) from the package substrate 110 or from an external component (not shown), such as socket interconnects. As will be understood to those in the skilled art, the specific geometry and required heat flux of the thermoelectric cooler for the embodiments of the present description may require thin film thermoelectric cooler devices, as they are able to handle high heat flux (e.g., greater than about 100 watts per square centimeter) and ability to apply relatively high current. The fabrication of thermoelectric cooler devices is well known in the art and for the sake of clarity and conciseness will not be discussed herein. As will be further understood, the control a thermoelectric cooler device will need dedicated logic, either within the electronic assembly 100 or external or it (e.g., on a carrier substrate), operating in a closed loop fashion to maintain a target temperature at the device level, i.e., for the integrated circuit devices 310, 320, and 330.

In another embodiment of the present description, the heat dissipation structure 200 may be proximate the at least one side 116 of the package substrate 110, such that the photonic integrated circuit device 300 may be positioned for the connection of the optical communication cable 150 near the side 116 of the package substrate 110. In a further embodiment of the present description, the heat dissipation structure 200 may extend from adjacent the photonic integrated circuit device 300 to the second surface 114 of the package substrate 110. In a specific embodiment of the present description, the heat dissipation structure 200 may extend from the bottom surface 354 of the cavity 350 to the second surface 114 of the package substrate 110.

Figure 3:
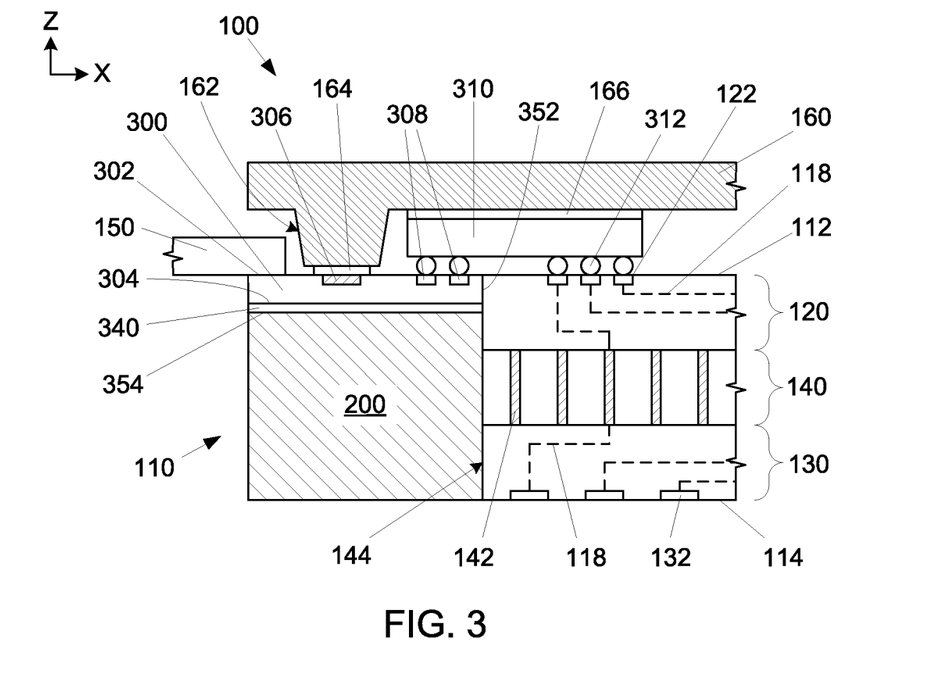

As shown in FIG. 3, the photonic integrated circuit device 300 may be sized and shaped the same or smaller than the heat dissipation structure 200, such that the heat dissipation structure 200 may be fabricated separately from the package substrate 110. The photonic integrated circuit device 300 may be attached to the heat dissipation structure 200 with the thermally conductive adhesive layer 340. A notch or opening 144 may be made through the package substrate 110 extending from the first surface 112 to the second surface 114 thereof. The combined heat dissipation structure 200 and the photonic integrated circuit device 300 may be inserted into the opening 144 and secured by any known technique. This may be done after the attachment of the electronic integrated chip 310 to the package substrate 110 in order to manage the position (i.e., Z-height) of the photonic integrated circuit device 300.

Figure 4:
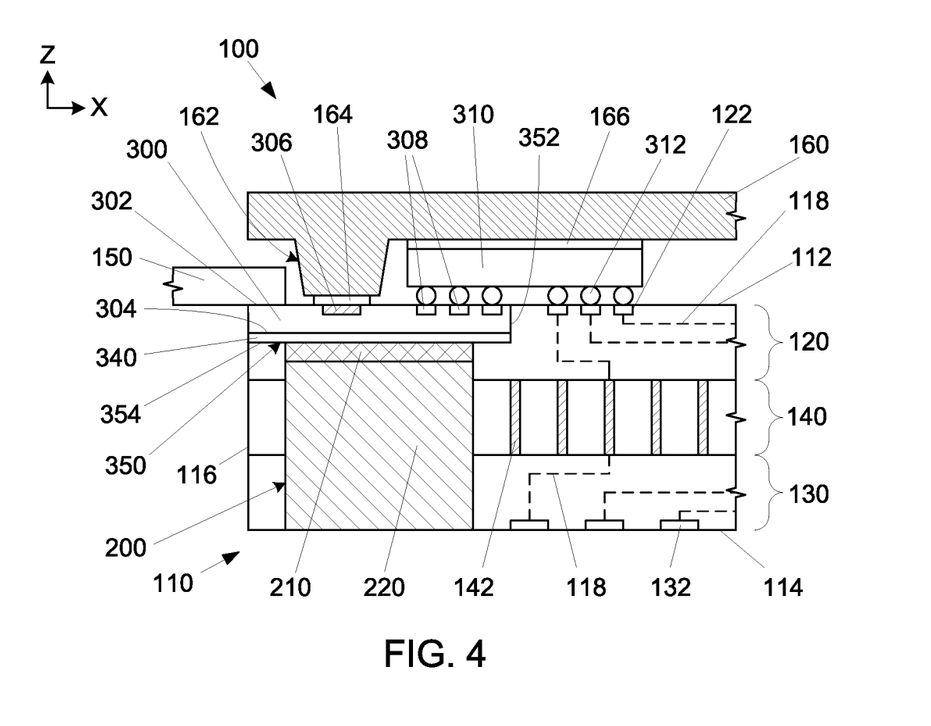
FIGS. 4-6 are side cross-sectional views of electronic assemblies including package substrates that include multi-component heat dissipation structures therein that are thermally coupled to photonic integrated circuit devices, according to various embodiments of the present description.

As shown in FIG. 4, the heat dissipation structure 200 may be a multicomponent structure. In one embodiment, the heat dissipation structure 200 may comprise a thermoelectric cooler portion 210 and a heat sink portion 220. As previously discussed, the thermoelectric cooler portion 210 may comprise any device that uses the Peltier effect to create a heat flux at a junction of two different types of materials. The heat sink portion 220 may comprise any bulk, thermally conductive material, including, but not limited to, metals, such copper, aluminum, alloys thereof, and the like.

Figure 5:
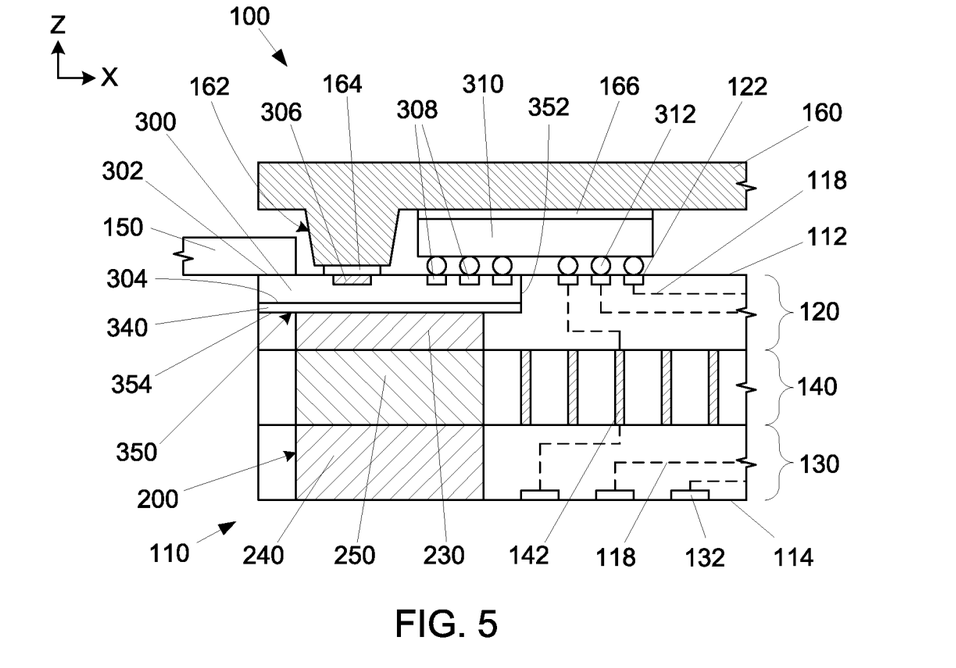
Figure 6:
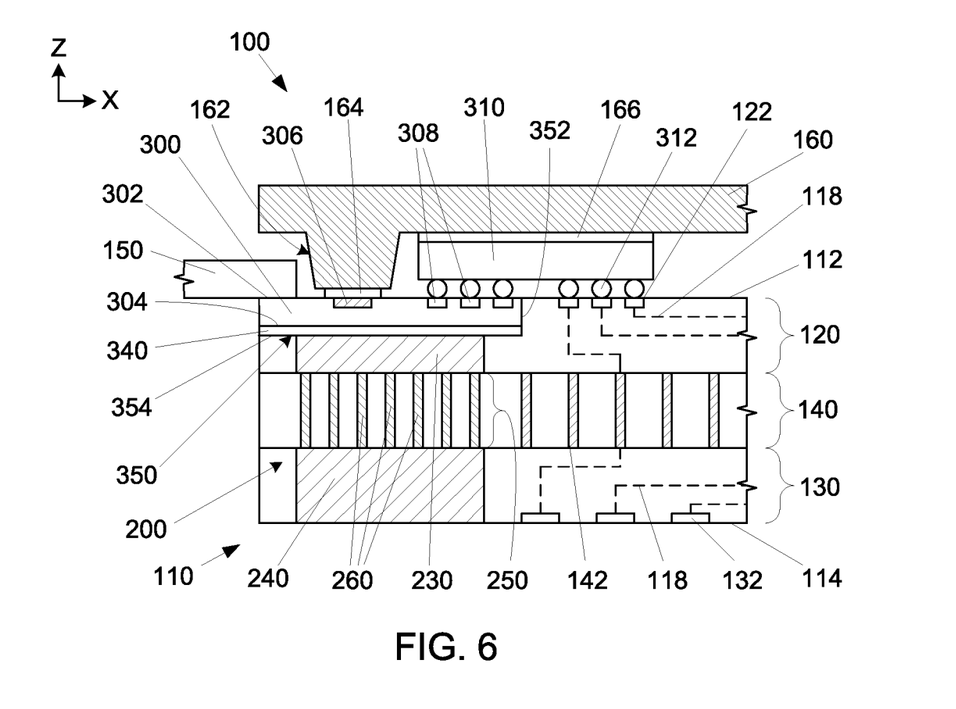

As previously discussed in one embodiment, the package substrate 110 may be a cored substrate comprising the first electrical routing layer 120, the second electrical routing layer 130, and the core 140 therebetween. The heat dissipation structure 200 may be comprise three components, wherein a first portion 230 is formed in the first electrical routing layer 120, a second portion 240 formed in the second electrical routing layer 130, and a core portion 250 formed the core 140, as shown in FIG. 5. In one embodiment of the present description, at least one of the first portion 230, the second portion 240, and the core portion 250 comprises a thermoelectric cooler. As shown in FIG. 6, the core portion 250 of the thermal dissipation structure 200 may comprise a plurality of thermally conductive vias 260, which may be through-hole vias that are formed when fabricating the electrically conductive vias 142 in the core 140 for the conductive routes 118 of the package substrate 110, as previously discussed.

Figure 7:
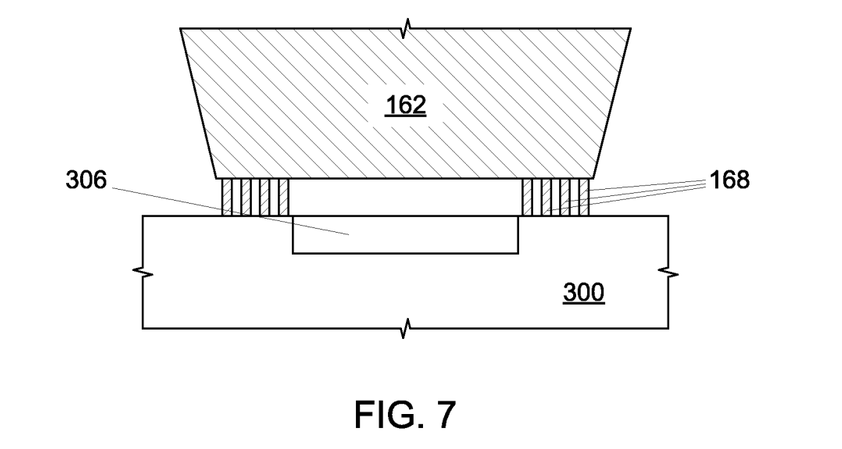
FIG. 7 is a side cross-sectional view of a thermal interface between an active surface of a photonic integrated circuit device and a heat dissipation device, according to an embodiment of the present description.

As previously discussed with regard to FIG. 2, the heat dissipation device 160 may include the footing 162 extending toward the photonic integrated circuit device 300, wherein the footing 162 may be thermally coupled to the active surface 302 of the photonic integrated circuit device 300 with a thermal interface material layer 164. However, the devices on the active surface 302 of the photonic integrated circuit device 300, such as the lasing component 306, may be sensitive to mechanical stress. In order not to cause any additional stress on the active devices on photonic integrated circuit device 300, bare thermal interconnects 168, such as solder balls and/or copper pillars, can be used to transfer heat from the photonic integrated circuit device 300 and the footing 162 without contacting the devices (e.g., the lasing component 306), as shown in FIG. 7. Additionally, using a deformable or resilient material for the thermally conductive adhesive layer 340 (see FIG. 2) between the photonic integrated circuit device 300 and the heat dissipation structure 200 to further decouple mechanical stresses on the photonic integrated circuit device 300.

Figure 8:
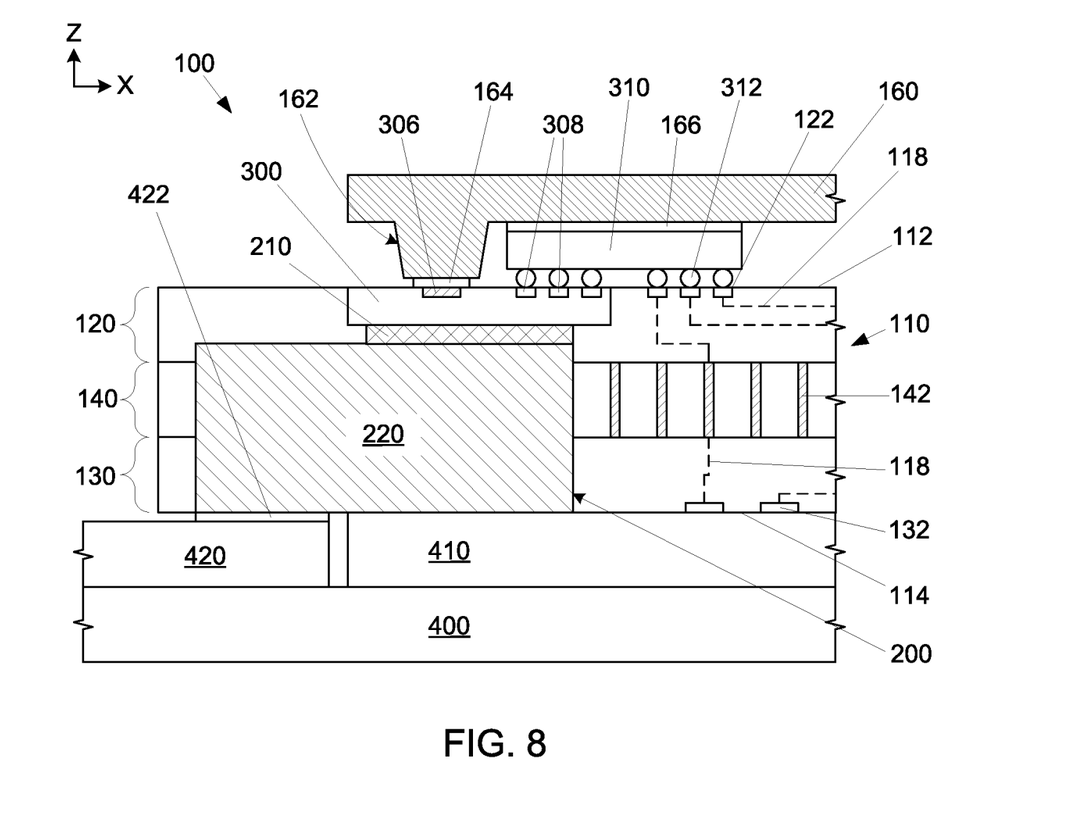
FIG. 8 is a side cross-sectional view of an electronic assembly having an integrated circuit assembly attached to a carrier substrate with a socket, wherein a heat sink is positioned between the integrated circuit assembly and the carrier substrate, and thermally connected to the heat dissipation structure within the package substrate, according to an embodiment of the present description.

As shown in FIG. 8, the electronic assembly 100 may be connected to a carrier substrate 400, such as a motherboard, through a socket 410. In standard configurations, the package substrate 110 would be substantially the same size as the socket 410, such that the heat dissipation structure 200 would have to dissipate heat through the socket 410. This thermal path may be limiting to heat dissipation from the photonic integrated circuit device 300. The embodiment shown in FIG. 8 illustrate that the package substrate 110 may be shaped for at least a portion thereof to extend beyond the socket 410, e.g. a "diving board" configuration. In this configuration, the portion extending beyond the socket 410 will not be used for electrical interconnection, but rather to expose a portion of the heat dissipation structure 200 for a direct thermal pathway to a heatsink 420 located adjacent to the socket 410 on the carrier substrate 400. The heatsink 420 may be any appropriate heat dissipation mechanism, including but not limited to a heat pipe, a heat spreader, and the like, and may be attached to the carrier substrate 400 by any known means, such as an adhesive (not shown). The heat dissipation structure 200 in the package substrate 110 may be thermally coupled to the heatsink 420 on the carrier substrate 400 with a compressible/removable thermal interface material 422.

Figure 9:
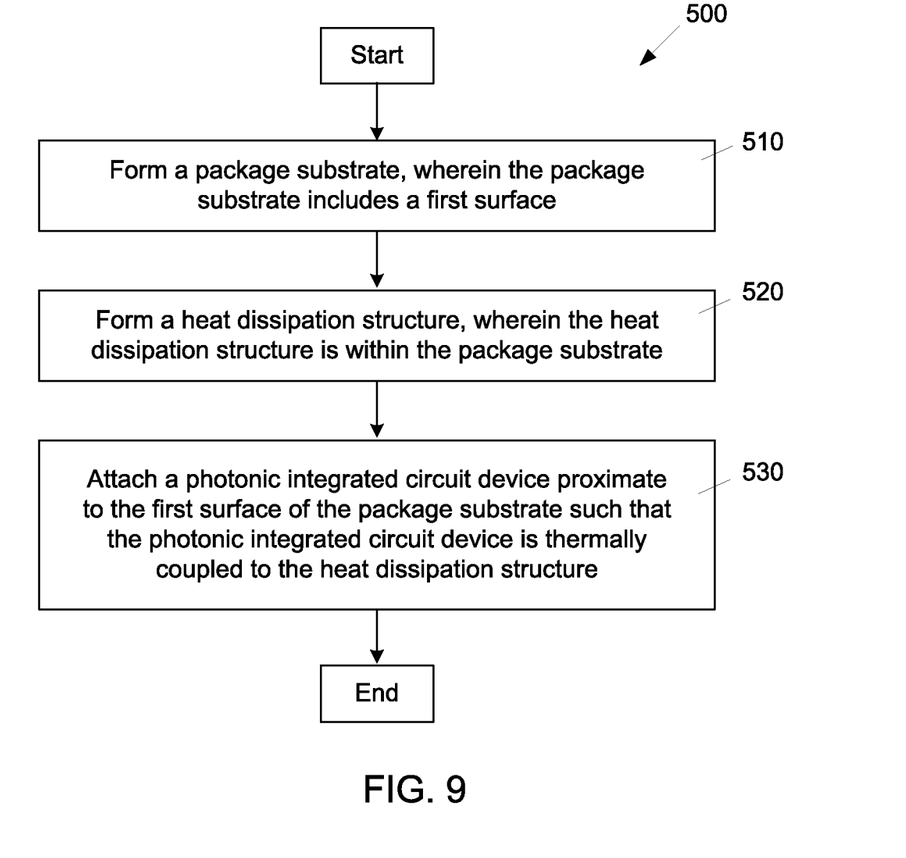
FIG. 9 is a flow chart of a process of fabricating an electronic assembly, according to an embodiment of the present description.

FIG. 9 is a flow chart of a process 500 of fabricating an integrated circuit assembly according to an embodiment of the present description. As set forth in block 510, a package substrate may be formed, wherein the package substrate includes a first surface. A heat dissipation structure may be formed, wherein the heat dissipation structure is within the package substrate, as set forth in block 520. As set forth in block 530, a photonic integrated circuit device may be attached proximate to the first surface of the package substrate such that the photonic integrated circuit device is thermally coupled to the heat dissipation structure.

Figure 10:
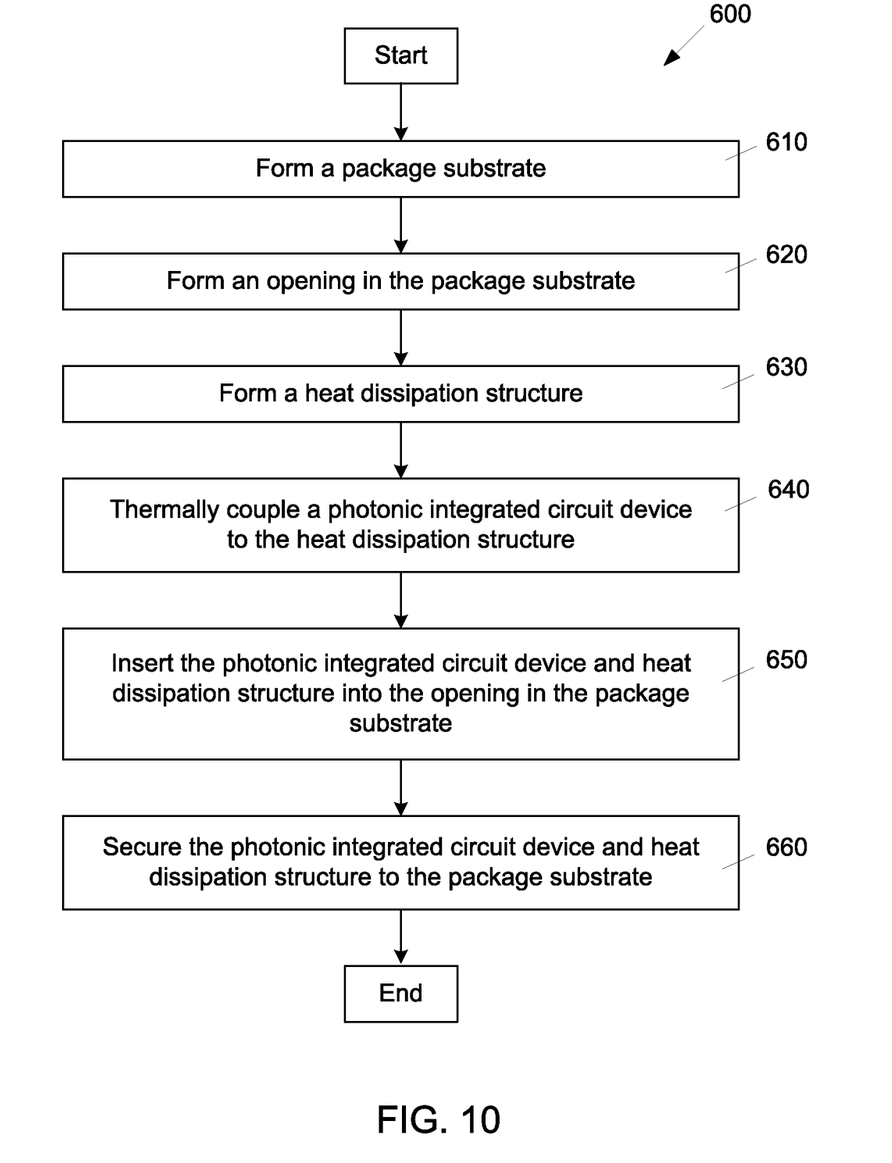
FIG. 10 is a flow chart of a process of fabricating an electronic assembly, according to another embodiment of the present description.

FIG. 10 is a flow chart of a process 600 of fabricating an electronic package according to an embodiment of the present description. As set forth in block 610, a package substrate may be formed. An opening may be formed in the package substrate, as set forth in block 620. As set forth in block 630, a heat dissipation structure may be formed. A photonic integrated circuit device may be thermally coupled to the heat dissipation structure, as set forth in block 640. As set forth in block 650, the photonic integrated circuit device and heat dissipation structure may be inserted into the opening in the package substrate and secured thereto. The photonic integrated circuit device and heat dissipation structure may be secured to the package substrate.

Figure 11:
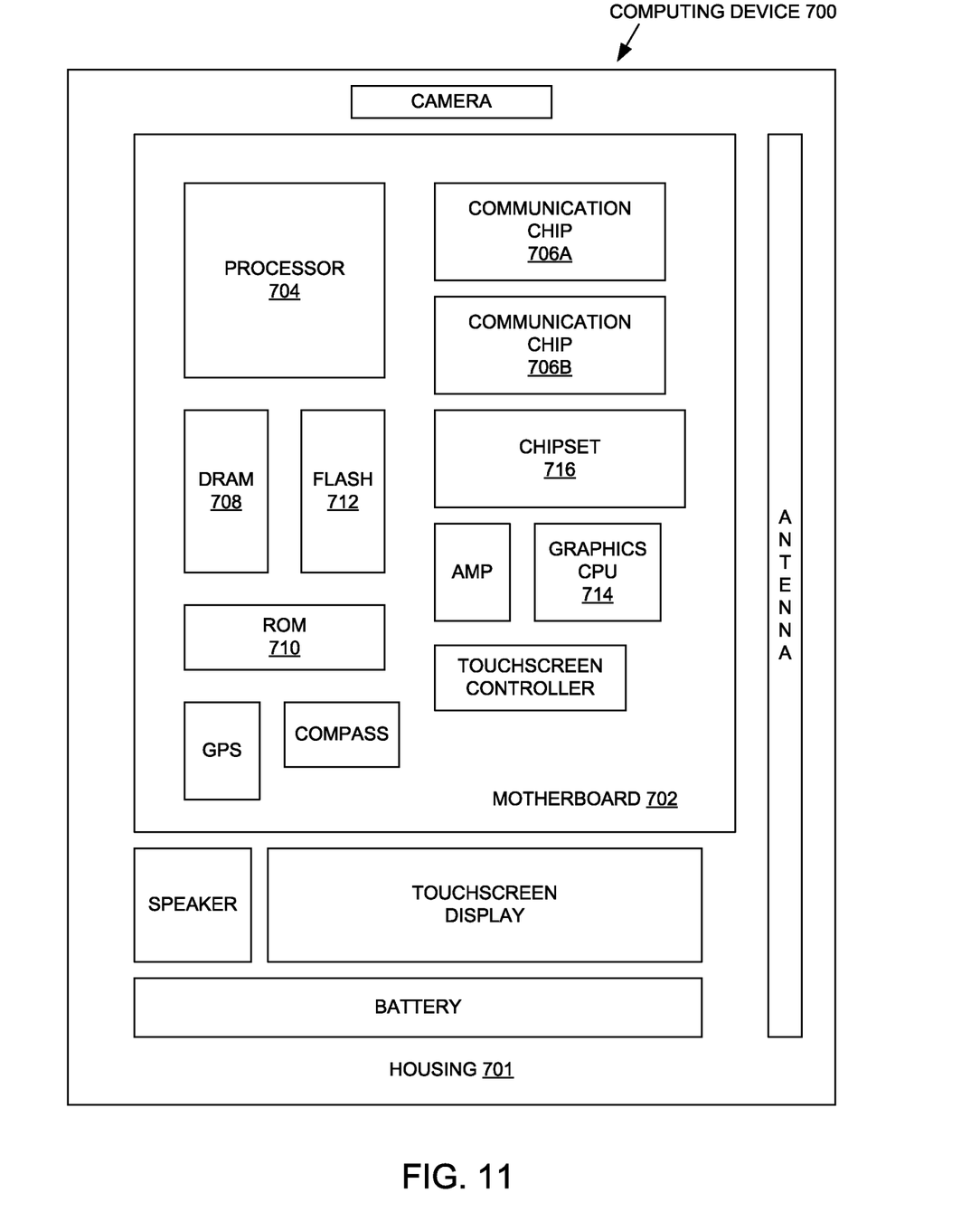
FIG. 11 is an electronic system, according to one embodiment of the present description.

FIG. 11 illustrates an electronic or computing device 700 in accordance with one implementation of the present description. The computing device 700 may include a housing 701 having a board 702 disposed therein. The computing device 700 may include a number of integrated circuit components, including but not limited to a processor 704, at least one communication chip 706A, 706B, volatile memory 708 (e.g., DRAM), non-volatile memory 710 (e.g., ROM), flash memory 712, a graphics processor or CPU 714, a digital signal processor (not shown), a crypto processor (not shown), a chipset 716, an antenna, a display (touchscreen display), a touchscreen controller, a battery, an audio codec (not shown), a video codec (not shown), a power amplifier (AMP), a global positioning system (GPS) device, a compass, an accelerometer (not shown), a gyroscope (not shown), a speaker, a camera, and a mass storage device (not shown) (such as hard disk drive, compact disk (CD), digital versatile disk (DVD), and so forth). Any of the integrated circuit components may be physically and electrically coupled to the board 702. In some implementations, at least one of the integrated circuit components may be a part of the processor 704.

The communication chip enables wireless communications for the transfer of data to and from the computing device. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device may include a plurality of communication chips. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

The term "processor" may refer to any device or portion of a device that processes electronic data from registers and/or memory to transform that electronic data into other electronic data that may be stored in registers and/or memory.

At least one of the integrated circuit components may include an integrated circuit package, which comprises a package substrate, wherein the package substrate includes a first surface; a heat dissipation structure within the package substrate; and a photonic integrated circuit device, wherein the photonic integrated circuit device is attached adjacent to the first surface of the package substrate and thermally coupled to the heat dissipation structure.

In various implementations, the computing device may be a laptop, a netbook, a notebook, an ultrabook, a smartphone, a tablet, a personal digital assistant (PDA), an ultra-mobile PC, a mobile phone, a desktop computer, a server, a printer, a scanner, a monitor, a set-top box, an entertainment control unit, a digital camera, a portable music player, or a digital video recorder. In further implementations, the computing device may be any other electronic device that processes data.

It is understood that the subject matter of the present description is not necessarily limited to specific applications illustrated in FIGS. 1-11. The subject matter may be applied to other integrated circuit devices and assembly applications, as well as any appropriate electronic application, as will be understood to those skilled in the art.

The following examples pertain to further embodiments and specifics in the examples may be used anywhere in one or more embodiments, wherein Example 1 is an apparatus, comprising a package substrate, wherein the package substrate includes a first surface; a heat dissipation structure within the package substrate; and a photonic integrated circuit device, wherein the photonic integrated circuit device is attached adjacent to the first surface of the package substrate and thermally coupled to the heat dissipation structure.

In Example 2, the subject matter of Example 1 can optionally include the package substrate including a second surface opposing the first surface, and at least one side extending between the first surface and the second surface; and wherein the heat dissipation structure extends from the first surface of the package substrate to the second surface of the package substrate.

In Example 3, the subject matter of any of Examples 1 and 2 can optionally include the package substrate including a second surface opposing the first surface, and at least one side extending between the first surface and the second surface; and wherein the heat dissipation structure is proximate the at least one side of the package substrate.

In Example 4, the subject matter of any of Examples 1 to 3 can optionally include the heat dissipation structure comprising a single, thermally conductive structure.

In Example 5, the subject matter of any of Examples 1 to 3 can optionally include the heat dissipation structure comprising a stacked structure including at least one thermoelectric cooler and at least one passive heat sink.

In Example 6, the subject matter of any of Examples 1 to 3 can optionally include the package substrate comprising a first electrical routing layer proximate the first surface thereof, a second electrical routing layer proximate the second surface thereof, and a core between the first electrical routing layer and the second electrical routing layer; and wherein the heat dissipation structure comprises a first portion within the first electrical routing layer, a second portion within the second electrical routing layer, and a plurality of thermally conductive vias extending through the core and thermally coupling the first portion of the heat dissipation structure and the second portion of the heat dissipation structure.

In Example 7, the subject matter of Example 6 can optionally include at least one of the first portion of the heat dissipation structure and the second portion of the heat dissipation structure comprising a thermoelectric cooler.

In Example 8, the subject matter of any of Examples 1 to 3 can optionally include the package substrate comprising a first electrical routing layer proximate the first surface thereof, a second electrical routing layer proximate the second surface thereof, and a core between the first electrical routing layer and the second electrical routing layer; and wherein the heat dissipation structure comprises a first portion within the first electrical routing layer, a second portion within the second electrical routing layer, and a core portion within the core.

In Example 9, the subject matter of Example 8 can optionally include at least one of the first portion of the heat dissipation structure, the second portion of the heat dissipation structure, and the core portion of the heat dissipation structure comprising a thermoelectric cooler.

In Example 10, the subject matter of any of Examples 1 to 9 can optionally include the first surface of the package substrate including a cavity and wherein the photonic integrated circuit device is attached to the first surface of the electronic substrate within the cavity.

Example 11 is an electronic system, comprising an electronic board and an integrated circuit package electrically attached to the electronic board, wherein the integrated circuit package comprises a package substrate, wherein the package substrate includes a first surface; a heat dissipation structure within the package substrate; and a photonic integrated circuit device, wherein the photonic integrated circuit is attached proximate to the first surface of the package substrate and thermally coupled to the heat dissipation structure.

In Example 12, the subject matter of Example 11 can optionally include the package substrate including a second surface opposing the first surface; further comprising a socket electrically attached to the board and the second surface of the package substrate; and further comprising a secondary heat dissipation device between the second surface of the package substrate and the board, wherein the secondary heat dissipation device is thermally coupled to the heat dissipation structure.

In Example 13, the subject matter of any of Examples 11 and 12 can optionally include the package substrate including a second surface opposing the first surface, and at least one side extending between the first surface and the second surface; and wherein the heat dissipation structure extends from the first surface of the package substrate to the second surface of the package substrate.

In Example 14, the subject matter of any of Examples 11 to 13 can optionally include the package substrate including a second surface opposing the first surface, and at least one side extending between the first surface and the second surface; and wherein the heat dissipation structure is proximate the at least one side of the package substrate.

In Example 15, the subject matter of any of Examples 11 to 14 can optionally include the heat dissipation structure comprising a single, thermally conductive structure.

In Example 16, the subject matter of any of Examples 11 to 14 can optionally include the heat dissipation structure comprising a stacked structure including at least one thermoelectric cooler and at least one passive heat sink.

In Example 17, the subject matter of any of Examples 11 to 14 can optionally include the package substrate comprising a first electrical routing layer proximate the first surface thereof, a second electrical routing layer proximate the second surface thereof, and a core between the first electrical routing layer and the second electrical routing layer; and wherein the heat dissipation structure comprises a first portion within the first electrical routing layer, a second portion within the second electrical routing layer, and a plurality of thermally conductive vias extending through the core and thermally coupling the first portion of the heat dissipation structure and the second portion of the heat dissipation structure.

In Example 18, the subject matter of Example 17 can optionally include at least one of the first portion of the heat dissipation structure and the second portion of the heat dissipation structure comprising a thermoelectric cooler.

In Example 19, the subject matter of any of Examples 11 to 14 can optionally include the package substrate comprising a first electrical routing layer proximate the first surface thereof, a second electrical routing layer proximate the second surface thereof, and a core between the first electrical routing layer and the second electrical routing layer; and wherein the heat dissipation structure comprises a first portion within the first electrical routing layer, a second portion within the second electrical routing layer, and a core portion within the core.

In Example 20, the subject matter of Example 19 can optionally include at least one of the first portion of the heat dissipation structure, the second portion of the heat dissipation structure, and the core portion of the heat dissipation structure comprising a thermoelectric cooler.

In Example 21, the subject matter of any of Examples 11 to 20 can optionally include the first surface of the package substrate including a cavity and wherein the photonic integrated circuit device is attached to the first surface of the electronic substrate within the cavity.

Example 22 is a method of fabricating an integrated circuit assembly, comprising forming a package substrate, wherein the package substrate includes a first surface; forming a heat dissipation structure, wherein the heat dissipation structure is within the package substrate; and attaching a photonic integrated circuit device proximate to the first surface of the package substrate such that the photonic integrated circuit device is thermally coupled to the heat dissipation structure.

In Example 23, the subject matter of Example 22 can optionally include forming the package substrate including forming a second surface opposing the first surface, and at least one side extending between the first surface and the second surface; and wherein forming the heat dissipation structure includes forming the heat dissipation structure to extend from the first surface of the package substrate to the second surface of the package substrate.

In Example 24, the subject matter of Example 23 can optionally include forming a heat dissipation structure and attaching a photonic integrated circuit device comprising forming the heat dissipation structure, attaching the photonic integrated circuit device to the heat dissipation structure, forming an opening through the package substrate, inserting the heat dissipation structure through the opening, and securing the heat dissipation structure to the electronic substrate.

In Example 25, the subject matter of any of Examples 22 to 24 can optionally include the package substrate including a second surface opposing the first surface, and at least one side extending between the first surface and the second surface; and wherein the heat dissipation structure is proximate the at least one side of the package substrate.

In Example 26, the subject matter of any of Examples 22 to 25 can optionally include the heat dissipation structure comprising a single, thermally conductive structure.

In Example 27, the subject matter of any of Examples 22 to 25 can optionally include the heat dissipation structure comprising a stacked structure including at least one thermoelectric cooler and at least one passive heat sink.

In Example 28, the subject matter of any of Examples 22 to 25 can optionally include the package substrate comprising a first electrical routing layer proximate the first surface thereof, a second electrical routing layer proximate the second surface thereof, and a core between the first electrical routing layer and the second electrical routing layer; and wherein the heat dissipation structure comprises a first portion within the first electrical routing layer, a second portion within the second electrical routing layer, and a plurality of thermally conductive vias extending through the core and thermally coupling the first portion of the heat dissipation structure and the second portion of the heat dissipation structure.

In Example 29, the subject matter of Example 28 can optionally include at least one of the first portion of the heat dissipation structure and the second portion of the heat dissipation structure comprising a thermoelectric cooler.

In Example 30, the subject matter of any of Examples 22 to 25 can optionally include the package substrate comprising a first electrical routing layer proximate the first surface thereof, a second electrical routing layer proximate the second surface thereof, and a core between the first electrical routing layer and the second electrical routing layer; and wherein the heat dissipation structure comprises a first portion within the first electrical routing layer, a second portion within the second electrical routing layer, and a core portion within the core.

In Example 31, the subject matter of Example 30 can optionally include at least one of the first portion of the heat dissipation structure, the second portion of the heat dissipation structure, and the core portion of the heat dissipation structure comprising a thermoelectric cooler.

In Example 32, the subject matter of any of Examples 22 to 31 can optionally include the first surface of the package substrate including a cavity and wherein the photonic integrated circuit device is attached to the first surface of the electronic substrate within the cavity.

Having thus described in detail embodiments of the present invention, it is understood that the invention defined by the appended claims is not to be limited by particular details set forth in the above description, as many apparent variations thereof are possible without departing from the spirit or scope thereof.

What is claimed is:

1. An apparatus, comprising:
    a package substrate, wherein the package substrate has a first surface and a second surface opposing the first surface and wherein the package substrate comprises;
        a first electrical routing layer proximate the first surface;
        a second electrical routing layer proximate the second surface thereof,
        a core between the first electrical routing layer and the second electrical routing layer; and
        one or more electrically conductive vias extending through the core and coupling the first electrical routing layer to the second electrical routing layer;
    a heat dissipation structure within the package substrate, the heat dissipation structure having a total width through the core exceeding that of individual ones of the one or more electrically conductive vias; and
    a photonic integrated circuit device, wherein the photonic integrated circuit device is attached proximate to the first surface of the package substrate and extends over an area of the heat dissipation structure.

2. The apparatus of claim 1, wherein the heat dissipation structure extends from adjacent the photonic integrated circuit device to the second surface of the package substrate.

3. The apparatus of claim 1, wherein the heat dissipation structure comprises a single, thermally conductive structure extending beyond an edge of the photonic integrated circuit device.

4. The apparatus of claim 1, wherein the heat dissipated structure comprises a stacked structure including at least one thermoelectric cooler and at least one passive heat sink.

5. The apparatus of claim 1, wherein the heat dissipation structure comprises a first portion within the first electrical routing layer, a second portion within the second electrical routing layer, and a plurality of thermally conductive vias extending through the core and thermally coupling the first portion of the heat dissipation structure and the second portion of the heat dissipation structure.

6. The apparatus of claim 5, wherein at least one of the first portion of the heat dissipation structure and the second portion of the heat dissipation structure comprises a thermoelectric cooler.

7. The apparatus of claim 1, wherein the heat dissipation structure comprises a first portion within the first electrical routing layer and of a first width, a second portion within the second electrical routing layer and of at least the first width, and a core portion within the core and of at least the first width.

8. The apparatus of claim 7, wherein at least one of the first portion of the heat dissipation structure, the second portion of the heat dissipation structure, and the core portion of the heat dissipation structure comprises a thermoelectric cooler.

9. The apparatus of claim 1, wherein the first surface of the package substrate includes a cavity, wherein the photonic integrated circuit device is attached to the first surface of the package substrate within the cavity, wherein the heat dissipation structure spans at least majority of a width of the cavity, and wherein the photonic integrated circuit device is separated from the heat dissipation structure by an intervening thermally conductive adhesive material layer.

10. A system, comprising:
    an electronic board; and
    the apparatus of claim 1 electrically attached to a socket on the electronic board, wherein the second surface of the package substrate is proximate to the electronic board, and wherein a portion of the heat dissipation structure extends laterally beyond an edge of the socket.

11. The system of claim 10, further comprising a secondary heat dissipation device adjacent to the edge of the socket and between the second surface of the package substrate and the board, wherein the portion of the heat dissipation structure that extends laterally beyond an edge of the socket extends over the secondary heat dissipation device and is thermally coupled to the secondary heat dissipation device.

12. The system of claim 11, wherein the package substrate includes at least one side extending between the first surface and the second surface and over the secondary heat dissipation device; and wherein the heat dissipation structure extends from under the photonic integrated circuit device to substantially planar with the second surface of the package substrate.

13. The system of claim 10, wherein the heat dissipation structure comprises a single, thermally conductive structure embedded within the package substrate.

14. The system of claim 10, wherein the heat dissipation structure comprises a stacked structure including at least one thermoelectric cooler and at least one passive heat sink.

15. The system of claim 10, wherein the heat dissipation structure comprises a first portion within the first electrical routing layer, a second portion within the second electrical routing layer, and a plurality of thermally conductive vias extending through the core and thermally coupling the first portion of the heat dissipation structure and the second portion of the heat dissipation structure.

16. The system of claim 15, wherein at least one of the first portion of the heat dissipation structure and the second portion of the heat dissipation structure comprises a thermoelectric cooler.

17. The system of claim 10, wherein the heat dissipation structure comprises a first portion within the first electrical routing layer, a second portion within the second electrical routing layer, and a core portion with the core.

18. The system of claim 17, wherein at least one of the first portion of the heat dissipation structure, the second portion of the heat dissipation structure, and the core portion of the heat dissipation structure comprises a thermoelectric cooler.

19. A method of fabricating an integrated circuit assembly, comprising:
   forming a package substrate, wherein forming the package substrate includes:
      forming a first electrical routing layer with a first surface over a first side of a core, the first electrical routing layer coupled to one or more electrically conductive vias extending through the core;
      forming a second electrical routing layer with a second surface over a second side of the core, the second electrical routing layer coupled to the one or more electrically conductive vias;
   forming a heat dissipation structure within the package substrate, the heat dissipation structure having a total width through the core exceeding a width of individual ones of the electrically conductive vias; and
   attaching a photonic integrated circuit device proximate to the first surface of the package substrate such that a width of the photonic integrated circuit device is over, and thermally coupled to, the heat dissipation structure.

20. The method of claim 19, wherein forming the heat dissipation structure includes forming the heat dissipation structure to extend from adjacent the photonic integrated circuit device to the second surface of the package substrate.

21. The method of claim 20, wherein forming a heat dissipation structure and attaching a photonic integrated circuit device comprises: attaching the photonic integrated circuit device to the heat dissipation structure with an adhesive film;
   forming an opening through the package substrate;
   inserting the heat dissipation structure through the opening; and
   securing the heat dissipation structure to the package substate.

22. The method of claim 19, wherein forming the heat dissipation structure comprises forming a single, thermally conductive structure.

23. The method of claim 19, wherein forming the heat dissipated structure comprises forming a stacked structure including at least one thermoelectric cooler and at least one passive heat sink.

24. The method of claim 19, wherein forming the heat dissipation structure comprises forming a first portion within the first electrical routing layer, forming a second portion within the second electrical routing layer, and forming a plurality of thermally conductive vias extending through the core to thermally couple the first portion of the heat dissipation structure and the second portion of the heat dissipation structure.

25. The method of claim 19, wherein forming the heat dissipation structure comprises forming a first portion within the first electrical routing layer, forming a second portion within the second electrical routing layer, and forming a core portion within the core.

* * * * *